United States Patent [19]

Ruble

[11] 4,021,650
[45] May 3, 1977

[54] VELOCITY COMMAND SIGNAL GENERATING APPARATUS

[75] Inventor: Frank D. Ruble, Hayward, Calif.
[73] Assignee: Xerox Corporation, Stamford, Conn.
[22] Filed: Nov. 19, 1975
[21] Appl. No.: 633,331
[52] U.S. Cl. .......................... 235/151.11; 318/569; 340/172.5; 444/1
[51] Int. Cl.$^2$ ........................................ G06F 15/46
[58] Field of Search .......... 235/151.11; 340/172.5; 444/1; 318/571, 569

[56] References Cited

UNITED STATES PATENTS

| 3,597,740 | 8/1971 | Daw et al. | 235/151.11 X |
| 3,651,314 | 3/1972 | Kosem | 235/151.11 |
| 3,739,158 | 6/1973 | Woodward | 235/151.11 |
| 3,789,971 | 2/1974 | Deyesso et al. | 235/151.11 X |
| 3,864,613 | 2/1975 | Cutler | 318/571 X |
| 3,941,988 | 3/1976 | Hagstrom | 235/151.11 |

Primary Examiner—Joseph F. Ruggiero
Attorney, Agent, or Firm—Michael J. Colitz, Jr.; Terry J. Anderson; Barry Paul Smith

[57] ABSTRACT

Apparatus for generating a velocity command signal representing a predetermined optimum velocity of movement of a selected one of a plurality of movable elements from its actual position to a desired stopping position. The apparatus comprises means responsive to a first signal representative of the distance to be traveled by the selected movable element from its actual position to a desired stopping position for generating a second signal proportional to a predetermined optimum velocity of movement for each of the plurality of movable elements when required to be moved a distance represented by the first signal. A plurality of multiplication means are respectively associated with the plurality of movable elements, each multiplication means being coupled to the means for generating a second signal and being capable when enabled of multiplying the second signal by a constant representative of the particular motion characteristics of the associated movable element in order to form a velocity command signal representing the predetermined optimum velocity of movement for the associated movable element. The apparatus also comprises means coupled to each of the plurality of multiplication means and responsive to a third signal representative of the selection of the selected movable element for enabling the multiplication means associated with the selected movable element.

27 Claims, 14 Drawing Figures

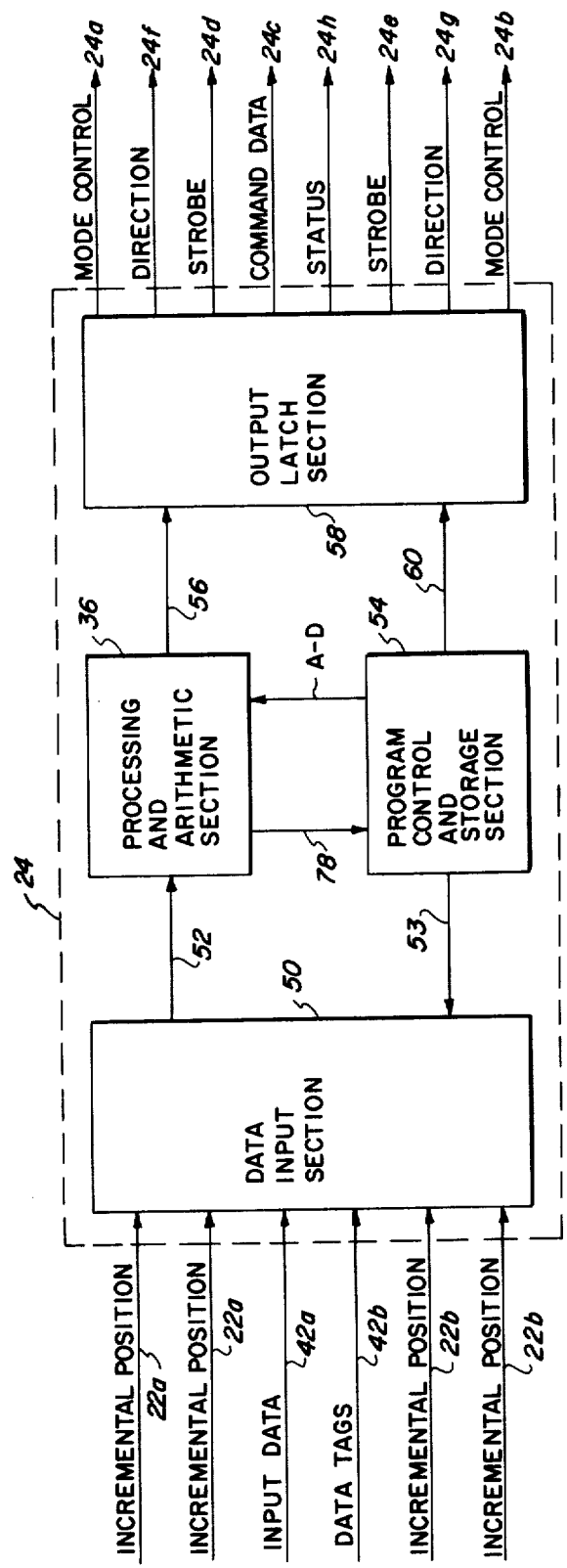

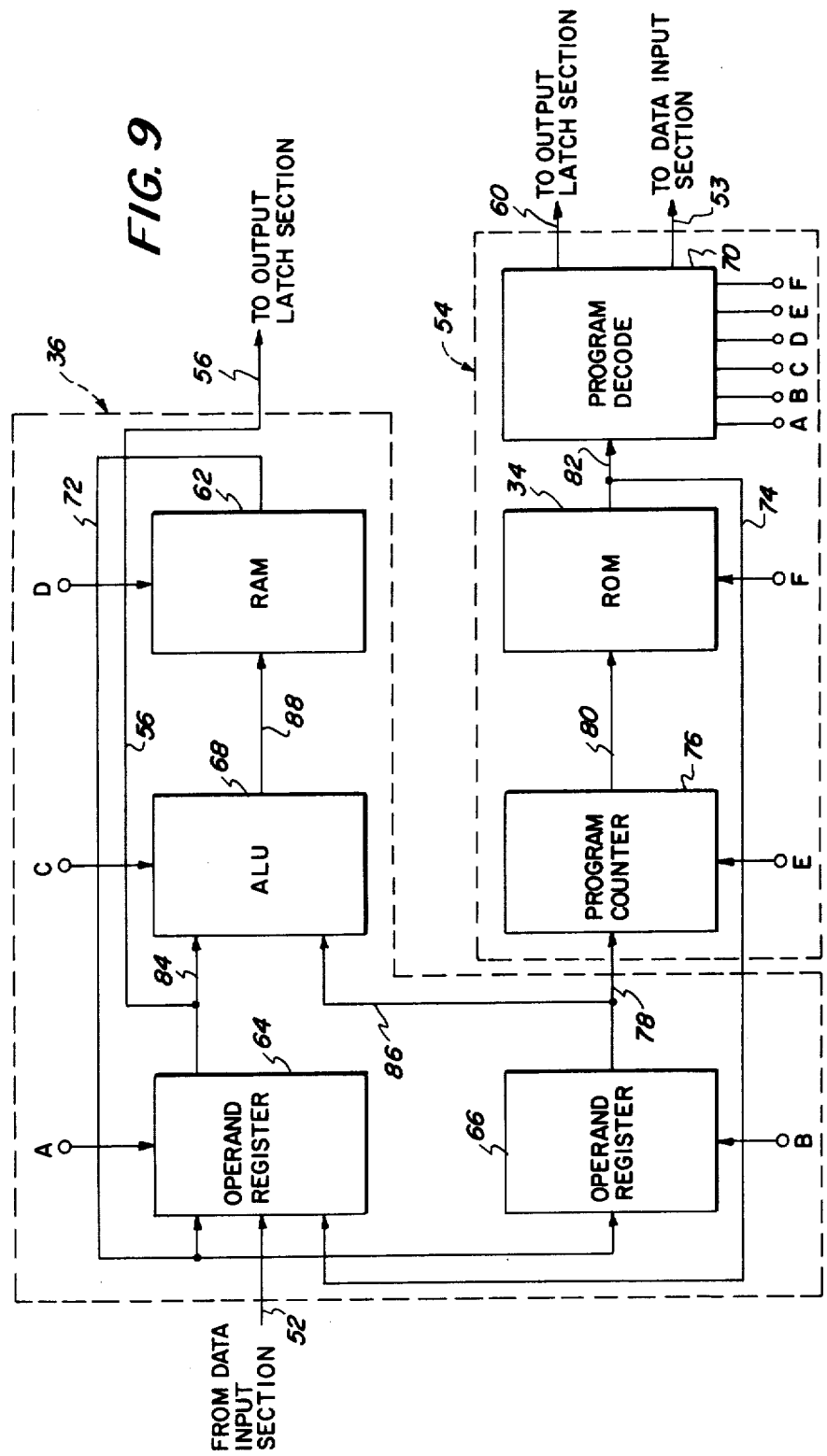

VELOCITY COMMAND SIGNAL GENERATING APPARATUS

BACKGROUND OF THE INVENTION

This invention relates to apparatus for generating a velocity command signal and, more particularly, to an apparatus for generating a velocity command signal representing a predetermined optimum velocity of movement of a selected one of a plurality of movable elements from its actual position to a desired stopping position.

Servo control systems have been frequently employed to move a movable element from its actual position to a desired stopping position. One type of servo control system is the so-called "linear-mode" servo which is normally characterized by the comparison of a first signal indicative of the desired position for the movable element and a second signal indicative of the actual position of the movable element with appropriate damping. A position error signal representative of such comparison is then generated and is used to drive a servo motor and thus the movable element in the proper direction. Another type of servo control system is the so-called "non-linear-mode" servo which is normally characterized by the comparison of a first signal indicative of a desired velocity at which the movable element is to be moved for any particular distance remaining to be traveled to a desired stopping position and a second signal indicative of the actual instantaneous velocity of movement of the movable element. A velocity error signal representative of such comparison is then generated and is used to drive the servo motor in the appropriate direction.

Certain machines having movable elements require extremely accurate positioning of such movable elements. An example of such machine is a high speed serial printer of the type employing a rotatable print wheel mounted to a linearly movable carriage. Both the rotational position of the print wheel and the linear position of the carriage must be very accurately determined and attained. With these machines, it has been found desirable to use yet another type of servo control system, commonly referred to as a "dual-mode" servo. In this servo, the positioning of the movable element is controlled first in a non-linear mode wherein an actual velocity signal is compared with a desired velocity signal (hereinafter referred to as a velocity command signal) and then a velocity error signal is generated to drive the servo motor. As the particular movable element reaches a predetermined position relative to the desired stopping position, the servo switches to a linear mode of operation where a third signal indicative of the actual incremental position of the movable element is compared with the second signal indicative of the actual velocity of such element and the resultant error signal drives the servo motor. The actual velocity signal performs strictly a damping function in the linear mode, as is conventional.

It will thus be apparent that both the non-linear-mode and dual-mode servos alluded to above required the generation of a velocity command signal indicative of a desired velocity of movement of the controlled movable element for a particular distance remaining to be traveled. The ideal velocity command signal would be that which is derived from a real time solution of the differential equation of motion for the particular movable element involved. This differential equation may be expressed generally as follows:

$$K_1\left(\frac{d^2x}{dt^2}\right) + K_2\left(\frac{dx}{dt}\right) + K_3(x) = 0,$$

where $K_1$, $K_2$ and $K_3$ are constants together defining the unique motion characteristics of the particular movable element in terms of its mass and other parameters, and $x$ is the distance remaining to be traveled.

As is well known, an approximation of the ideal velocity command signal can be obtained through a real time solution of the equation:

$$y = K\sqrt{x},$$

where K is a single constant defining the unique motion characteristics of the particular movable element, x is the distance remaining to be traveled and y is the velocity command signal.

U.S. Pat. No. 3,639,754 discloses a system for computing a so-called stopping pattern signal for a vehicle. As described in the patent, the stopping pattern signal is generated electronically in accordance with the term $K\sqrt{x}$, where the value $\sqrt{x}$ is generated as the digital output of a $\sqrt{x}$ counter and is then converted into analog form by a D/A converter. This analog signal is then attenuated in accordance with a resistor circuit in order to effectively multiply the analog $\sqrt{x}$ signal by a constant K.

Examples of other systems which include apparatus for generating a velocity command signal satisfying a desired velocity-distance profile are disclosed in U.S. Pat. Nos. 3,737,751 and 3,582,629.

Among the machines requiring the control of a plurality of movable elements is the one disclosed in U.S. patent 3,821,629. Movement of each of the movable elements of that machine is controlled by a separate linear-mode (position) servo system. A plurality of position command signals are calculated for the required movements of the plurality of movable elements and are supplied on a time-shared basis to the respective plurality of servo control systems.

As alluded to above, another machine having a plurality of controllably movable elements is a high speed serial printer of the type including a rotatable print wheel mounted to a linearly movable carriage. Prior art high speed printers of this type have used two separate valocity command signals generating apparati to generate the two separate velocity command signals required. Although this arrangement has proven effective from an operational standpoint, it is clear that the use of duplicative circuits adds to the cost and complexity of the system.

In addition to the above, many prior art velocity command signal generating apparati, particularly those used in high speed serial printers, have used non-linear feedbacks elements in at least one stage thereof. These elements are typically steered by diode networks. When the inaccuracies of the non-linear elements and diode networks are added to the uncertainties of the movable elements, it is necessary to provide a means of adjusting the system for reliable operation.

It would be desirable, therefore, to provide a single velocity command signal generating apparatus capable of generating a plurality of velocity command signals for each of a plurality of servo control systems in order that the movements of a respective plurality of movable

3 elements may be controlled. It would further be desirable if such single velocity command signal generating apparatus were devoid of non-linear feedback elements and diode steering networks.

SUMMARY OF THE INVENTION

The present invention has recognized that the real time solution of the differential equation of motion:

$$K_1\left(\frac{d^2x}{dt^2}\right) + K_2\left(\frac{dx}{dt}\right) + K_3(x) = 0$$

yields a phase trajactory of velocity versus distance having identical shape for all moving mass systems that can be so described. The same is true for a real time solution of the approximation equation of motion:

$$Y = K\sqrt{x}$$

Only the "scale" of the phase plane changes in accordance with the value of the constants $K_1$, $K_2$ and $K_3$ in the differential equation and the constant K in the approximation equation.

In view of the above, a velocity command signal generating appratus in accordance with the present invention includes means responsive to a first signal representative of the distance to be traveled by a selected one of a plurality of movable elements (1,2---n) from its actual position to a desired stopping position for generating a second signal proportional to a predetermined optimum velocity of movement for each of the plurality of movable elements when required to be moved a distance represented by the first signal.

As an example, the above-mentioned means may include an addressable memory capable of storing at each of its address locations a normalized solution to an equation of motion for a particular distance remaining to be traveled. In terms of the approximation equation $y = K\sqrt{x}$, for example, the normalized solution stored at each address would be $K_0 \sqrt{x}$ or, simply, $\sqrt{x}$. The proper velocity command signal for each movable element having a distance $x$ left to be traveled would then be definable by multiplying the normalized velocity command signal $\sqrt{x}$ by the appropriate constant $K_1$, $K_2$, ---or $K_n$ representative of the particular motion characteristics of the selected movable element (1,2,----or n).

To this end, the apparatus according to the present invention further includes a plurality of multiplication means respectively associated with the plurality of movable elements, each multiplication means being coupled to the means for generating a second signal (normalized velocity command signal) and being capable when enabled of multiplying the second signal by a constant representative of the particular motion characteristics of the associated movable element in order to form a velocity command signal representing a predetermined optimum veocity of movement for the associated movable element; and means coupled to each of the plurality of multiplication means and responsive to a third signal representative of the selection of the selected movable element for enabling the multiplication means associated with the selected movable element.

In accordance with a preferred embodiment of the present invention, a general purpose data processor is programmed to generate normalized velocity command data and to selectively enable the plurality of multiplication means. With respect to the generation of normalized velocity command data, this is accomplished through the use of an addressable memory, preferably a read-only-memory (ROM), included in the processor and having a number of addressable memory locations. Each memory location stores the normalized solution to an equation of motion, preferably $y = K\sqrt{x}$, for each of a predetermined number of increments of travel. The total number of increments define the maximum distance required to be traveled by any of the movable elements.

Thus, if it is desired to move a first movable element a distance represented by five increments of travel until it reaches a desired stopping position and a second movable element a distance represented by ten increments of travel until it reaches its desired stopping position, the processor program first causes the ROM to generate an output representative of $\sqrt{x_5}$, where $x_5$ is a distance equal to five increments of travel. This value, which is in digital-binary form, is converted to analog form by a digital-to-analog (D/A) converter and then effectively multiplied by a constant $K_1$ defining the unique motion characteristics of the first movable element. The resultant signal $K_1 \sqrt{x_5}$ will then be representative of an optimum velocity of movement of the first movable element for a remaining distance equal to five increments of travel. A few microseconds later, the processor program causes the ROM to generate another normalized velocity command signal, $\sqrt{x_{10}}$, where $x_{10}$ is a distance equal to ten increments of travel. A second analog velocity command signal $K_2 \sqrt{x_{10}}$ will then be derived in a manner entirely similar to that described above.

Each time one of the movable elements is moved an increment closer to its desired stopping position, the data processor senses this condition and causes the "distance remaining" (address) input to the ROM to be updated thereby resulting in the generation of up-dated normalized velocity command data. This data will then be converted to analog form and multiplied by the appropriate constant since the corresponding multiplication means would have again been enabled by the processor. In this manner, velocity command signals $K_1 \sqrt{x_4} - K_1 \sqrt{x_1}$ will be successively generated as the first movable element is moved, whereas velocity command signals $K_2 \sqrt{x_9} - K_2 \sqrt{x_1}$ will be successively generated for the second movable element. It will thus be clear that the dataprocessor supplies "distance remaining" data to its ROM on a time-shared basis. In view of this fact, and due to the extremely fast processing speeds of modern day dataprocessors, it is possible to generate the requisite velocity command signals on a virtually real-time basis with the resultant control of the movements of a plurality of movable elements occurring simultaneously. This desired result is achieved without the use of accuracy hampering non-linear feedback elements and diode steering networks.

It must be noted that the use of the word "increments" to express distances traveled or remaining to be traveled does not necessarily imply that the servo control systems move the respective movable elements in stepped increments. Rather, the incremental distance values forming the address locations of the ROM are merely to define convenient points along a maximum distance to be traveled at which to indicate what a normalized optimum velocity of travel is at these points. The servo control systems could be, and are preferably, arranged to effect a continuous movement of the respective movable elements between actual and desired stopping positions.

In accordance with a further aspect of the preferred embodiment of the present invention, each normalized valocity command signal generated by the processor is forwarded to a plurality of sample-and-hold (S/H) circuits respectively associated with the plurality of servo control systems. The signal is loaded into and stored in only that one of the S/H circuits which is associated with a selected one of the movable elements, such enabling taking place under program control in response to the receipt by the processor of a signal representing the selection of such one movable element. Each S/H circuit includes means for multiplying the normalized valocity command signal by a constant ($K_1$, $K_2$—or $K_n$) representative of the unique motion characteristics of the respective movable element.

In yet another aspect of the preferred embodiment of the present invention, a smoothing circuit is coupled to each S/H circuit for smoothing out the velocity-distance profile established as the result of a succession of velocity command signals generated for a particular movable element moving a plurality of "increments" of travel toward a desired stopping position. In this manner, a more accurate real time solution of the equation of motion is realized.

These and other aspects and advantages of the present invention will be more completely described below with reference to the accompanying drawings.

BRIEF DESCRIPTION OF THE DRAWINGS

FIG. 8 is a functional block diagram representation of the data processor shown in FIG. 1;

FIG. 9 is a more detailed block diagram of the processing and arithmetic section and the program control and storage section of the processor as depicted in FIG. 8.

DESCRIPTION OF THE PREFERRED EMBODIMENT

Figure 1:
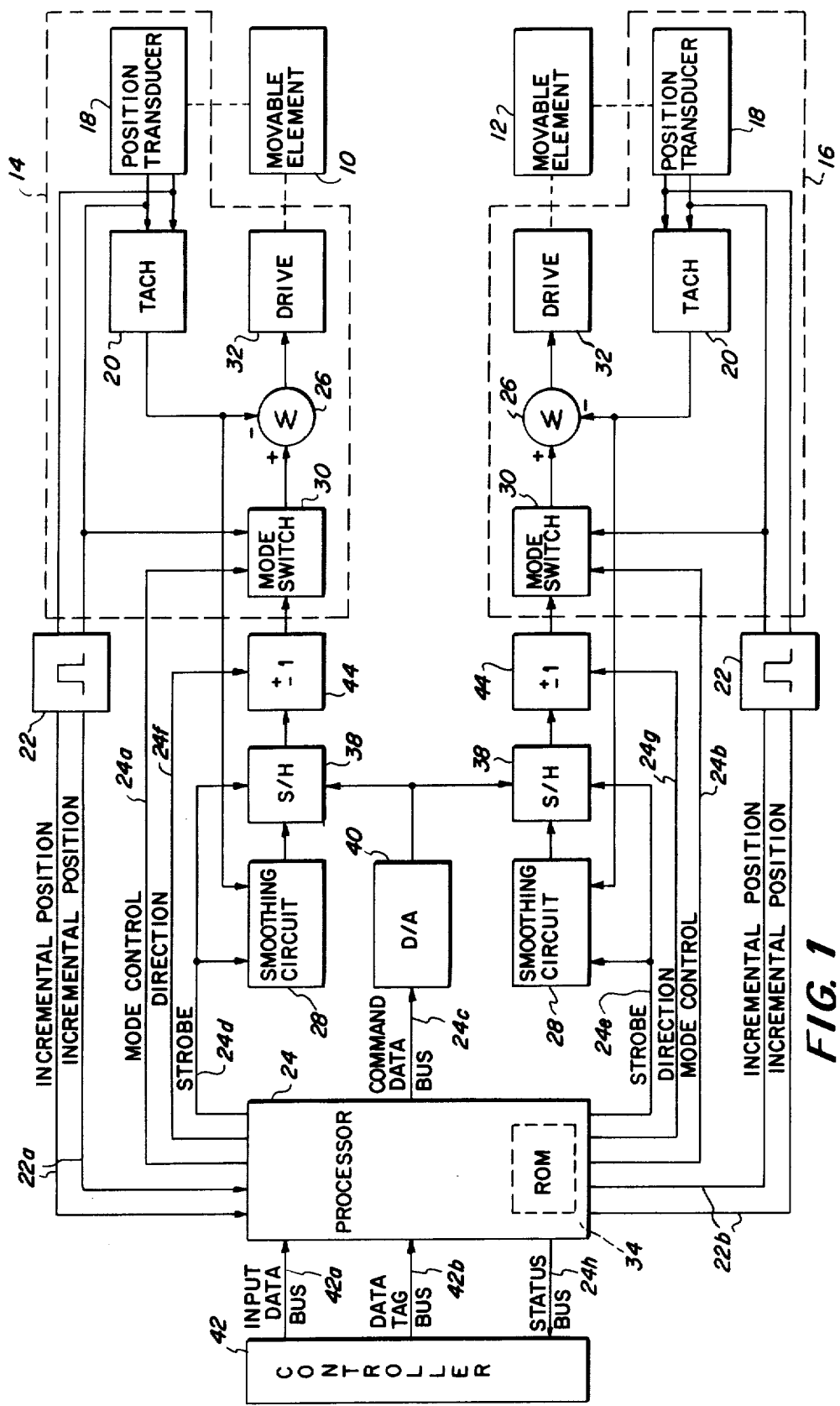
FIG. 1 is a schematic block diagram of a preferred embodiment of the present invention as used in conjunction with a pair of dual-mode servo control systems for controlling the movement of a respective pair of movable elements.

Referring to FIG. 1, a pair of movable elements 10 and 12 are shown, the respective movements of which are controlled by separate servo control systems 14 and 16. The disclosure of only two movable elements is merely exemplary, as it will become clear that the present invention can be used with any number of movable elements. Movable elements 10 and 12 may be part of a machine requiring accurate positioning of such elements. For example, movable elements 10 and 12 may respectively comprise the rotatable print wheel and linearly movable carriage of a high speed printer.

Each servo control system 14 and 16 is of a type which utilizes valocity command data as a reference input, such as a non-linear servo or a dual-mode servo. For purposes of future explanation, each servo control system 14 and 16 is shown as being of the dual-mode type. Thus, each servo control system includes a position transducer 18 kinematically coupled to the respective movable element. Each position transducer is of a type which generates an output signal indicative of the actual incremental position of the movable element with respect to a reference location. This output signal may, for example, be a periodic signal, such as a sinusoidal signal, wherein the peaks (positive and/or negative) or zero crossings define increments of movement of the movable element. The output signal is preferably comprised of a pair of phase-displaced sinusoidal or similarly periodic signals (hereinafter referred to as incremental position signals) in order that the direction of travel be ascertained in addition to the location of the movable element. An example of a position transducer generating a pair of phase-displaced incremental position signals is disclosed in U.S. Pat. No. 3,839,665.

The pair of incremental position signals generated from each position transducer 18 are coupled to an associated tachometer 20 and through an associated pulse generator 22 to a processor 24, to be described in more detail below. Additionally, a selected one of the pair of incremental position signals (hereinafter referred to as the selected incremental position signal) is coupled to one input of an associated mode switch 30. Each pulse generator 22 may be of any suitable type capable of generating a pulse each time the respective movable element 10 or 12 moves one predefined increment of travel in either direction. Thus, pulse generator 22 may be arranged to generate a pulse every time each incremental position signal applied thereto reaches a positive and/or negative peak or zero crossing, for example. The resultant phase-displaced pulse trains are applied on lines 22a (movable element 10) and lines 22b (movable element 12) to the processor 24. Each tachometer 20 may be of any conventional variety capable of deriving from a pair of incremental position signals applied thereto a signal indicative of the actual velocity of the respective movable element. A particular tachometer arrangement especially suited for the position transducer disclosed in the aforementioned U.S. Pat. No. 3,839,665 is also disclosed in that patent.

The actual velocity signal from each tachometer 20 is continuously applied as a negative input to a conventional summing circuit (summer) 26 and is also applied as an input to a smoothing circuit 28, to be described in more detail below. Each summer 26 also receives as a positive inut the output signal from mode switch 30. This output signal is either the selected incremental osition signal from transducer 18 or a velocity command signal as generated from the unique velocity command signal generating apparatus of the present invention, to be described in more detail below. A separate mode control signal from processor 24 controls the state of each mode switch 30 to determine which output signal will be generated therefrom. In the example shown in FIG. 1, therefore, two mode control lines 24a and 24b are coupled from processor 24 to respective mode switches 30.

Each summer 26 effectively compares the actual velocity signal from the associated tachometer 20 with the output signal from the associated mode switch 30 and transmits a signal representative of such comparison to a drive meand 32, which may include conventional amplifier and drive circuits and a conventional servo motor (all not shown). The servo motor of each drive means is kinematiclly coupled to the associated movable element 10 or 12 for directly controlling the direction and speed of movement of such element.

Each servo control system 14 and 16 therefore comprises a position transducer 18, tachometer 20, mode switch 30, summer 26 and drive means 32. In operation, the actual velocity signal from tachometer 20 is compared at summer 26 with either the velocity command signal supplied by the apparatus of the present invention or the selected incremental position signal from the associated position transducer 18, depending upon the distance remaining to be traveled by the movable element, as represented by a predetermined number of increments. If a movable element has greater than a preselected distance to be traveled, for example one increment, the servo control system will operate in a non-linear mode wherein the actual velocity signal is compared with the velocity command signal. In this mode, the mode control signal from processor 24 will cause the mode switch to forward only the velocity command signal to summer 26. Movement of the movable element will then be controlled solely in dependence upon the comparison of actual velocity signal and the velocity command signal. When the movable element reaches the aforesaid predetermined distance, e. one increment remaining, the mode control signal changes causing the mode switch to a linear mode wherein the selected incremental position signal instead of the velocity command signal is compared with the actual velocity signal. As is conventional, the actual velocity signal in this mode is used for damping purposes only.

Referring again to FIG. 1, the unique apparatus of the present invention comprises means responsive to a first signal representative of the distance to be traveled by a selected one of the two movable elements 10 and 12 from its actual position to a desired stopping position for generating a second signal proportional to a predetermined optimum velocity of movement for each of the movable elements when required to be moved a distance represented by the first signal. In accordance with the preferred embodiment depicted in FIG. 1, the means above referred to is defined by an addressable memory, such as a read-only memory (ROM) 34, included in processor 24. The address locations of the ROM represent different incremental distances to be traveled by either of the movable elements 10 and 12 and are addressed by appropriate address signals defining such address locations.

The first signal referred to above is thus defined in the preferred embodiment by an address signal which is generated internally of the processor 24. As will be explained in more detail below in connection with FIG. 8, processor 24 is preferably a programmed general purpose data processor, desirably of the microprocessor variety, which includes a processing and arithmetic section 36 (see FIG. 8). Among other programed functions, section 36 derives an address signal by comparing a signal representative of a desired position to which the selected movable element is to be moved (hereinafter referred to as the desired position signal) with a signal representative of the actual position of the movable element, such actual position signal being derived from the incremental position pulses generated from the respective pulse generator 22.

More specifically, and as will be described in more detail below in connection with FIGS. 10A – 10E, the processor program, upon start-up, causes the two movable elements 10 and 12 to be "initialized". As used herein, the term "initialized" refers to the initial positioning of the movable elements at predefined reference, or incremental zero, positions. Upon initialization, a binary zero value is set at each of two address locations in a random access memory (RAM) 62 which forms part of the arithmetic and processing section 36 (see FIGS. 8 and 9). Each address location is associated with a respective one of the movable elements.

Thereafter, as each movable element is moved, the processor 24 senses the occurrence of each incremental position pulse in a predetermined one of the pair of pulse trains from the respective pulse generator 22. Upon each such occurrence, the processor causes the binary value stored at the corresponding RAM address location to be incremented or decremented by one, depending upon the direction of travel, thereby enabling the processor to continuously monitor the actual position of each movable element. The processor 24 detects the direction of travel of each movable element by comparing, under program control, the phase differential between the two incremental pulse trains generated by the pulse generator 22 associated with the movable element. It is then the binary value stored at each of the two RAM address locations, as representative of the actual position of the respective movable element, which is compared by section 36 of the processor under program control with the desired position information for that movable element. The desired position signal is applied to processor 24, preferably in bitparallel format, along an input data bus 42a from a suitable host controller 42 and is also desirably stored in a corresponding address location of RAM 62 until a new desired position signal is received.

It must be pointed out that the use of address locations in a RAM to store and update actual position information of the movable elements 10 and 12 is merely by way of preference and not of necessity. This arrangement is preferred due to the fact that processor 24 is desirably a programmed microprocessor. Should a hard-wired processor be utilized instead, two conventional up-down counters could be employed instead of RAM 62, wherein each would be reset to zero upon initialization and then incremented or decremented by one, depending upon the direction of travel, at the occurence of each incremental position pulse in the predetermined pulse train generated by the associated pulse generator 22.

Figure 2:
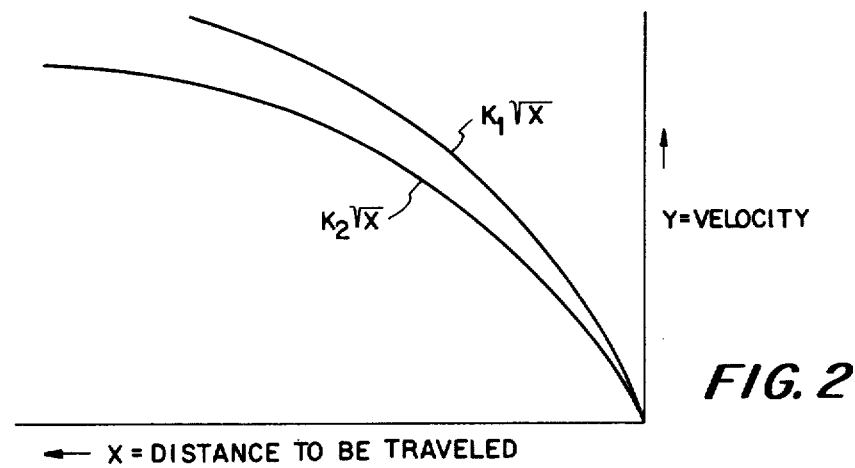
FIG. 2 is a graphical representation of a pair of deceleration curves respectively satisfying the equations of motion: $y = K_1 \sqrt{x}$ and $y = K_2 \sqrt{x}$, where $K_1 \neq K_2$.

The contents of each address location of the ROM 34 is a digital binary word representing a normalized velocity command signal. This binary word defines the second signal above referred to which is proportional to a predetermined optimum velocity of movement for each of the movable elements when required to be moved a distance represented by the address signal input to the ROM. This relationship is true since each of the movable elements' describing equation of motion yields a velocity-distance trajectory having the same shape. Only the "scale" of the phase plane changes. In terms of the approximation equation of motion $y = K \sqrt{x}$, for example, different movable elements 10 and 12 having different defining constants $K_1$ and $K_2$, respectively, would yield the deceleration curves shown in FIG. 2. As evident, these curves, although different scale, have the identical shape. Thus, the normalized velocity command signal referred to above (second signal), when considering the equation of motion $y = K \sqrt{x}$, would be expressed as $K_0 \sqrt{x}$ or, simply, $\sqrt{x}$.

In accordance with the preferred embodiment, ROM 34 is designed to store the normalized value, $\sqrt{x}$, for each of a predetermined number of incremental distances, $x$, defining corresponding address locations of the ROM. However, and as will be described in more detail below, only those address locations corresponding to increments of travel less than a preselected number e.g. 13, store a binary word representing the normalized value $\sqrt{x}$ for that distance of travel, $x$. For incremental distances greater than such preselected number, i.e. 14-$x$(max), the address locations store a digital binary word representative of a normalized maximum velocity of travel (hereinafter referred to symbolically as $y_c$(max)). This relationship is shown graphically in FIG. 3.

It must again be pointed out that the use of the word "increments" to express distances traveled or remaining to be traveled does not necessarily imply that the servo control systems move the respective movable elements in stepped increments. Rather, the incremental distance values forming the address locations of the ROM are merely to define convenient points along a maximum distance to be traveled at which to indicate what a normalized optimum velocity of travel is at these points. The servo control systems could be, and are preferably, arranged to effect a continuous movement of the respective movable elements between actual and desired stopping positions.

Processor 24 is preferably a microprocessor, as indicated above, which is programmed to supply various control signals to components of the overall system, as well as including a ROM 34 or similar type memory device having the function as abovedescribed It will become clear from the description to follow, however, that a programmed microprocessor or other data processor need not be employed for generating the requisite control signals and normalized velocity command signals. A separate hard-wire control means could equally well be used to generate the requisite control signals with a separate memory device generating the normalized velocity command signals under hard-wired control. The use of a data processor, particularly a microprocessor, programmed to carry out the specific functions required to preferred due to its cost, speed and versatility. The general make-up of a preferred processor 24 and the operational sequence it performs relative to the generation of velocity command signals will be more completely described below with reference to FIGS. 8,9 and 10A – 10E. It should be noted at this point, however, that there are a number of microprocessors currently commercially available which are capable of being adequately programmed to carry out the present invention. An example of one such processor is the INTEL 8080 processor manufactured by the Intel Corporation of Santa Clara, California.

Referring again to FIG. 1, the apparatus of the present invention additionally comprises a plurality of multiplication means respectively associated with the plurality of movable elements. Since only two exemplary movable elements 10 and 12 are shown, only two multiplication means are disclosed. Each multiplication means is included in a separate sample-and-hold (S/H) circuit 38 which is coupled to the output of a digital-to-analog (D/A) converter 40. It will be evident from the discussion to follow that each multiplication means could be included anywhere in the output circuit of the D/A converter. The inclusion of each in a separate S/H circuit 38 is only by way of convenience and not of necessity.

As will be described in more detail below in connection with FIG. 7, each multiplication means preferably includes a resistive element or elements in the respective S/H circuit 38 connected to the output of the D/A converter 40 and having the effect of multiplying the output signal from the D/A converter by a constant $K_1$ or $K_2$, respectively. The use of S/H circuits 38 is deemed desirable due to the extremely fast speeds at which velocity command data is presented from processor 24 along a command data bus 24c to the input terminals of D/A converter 40 and thus from the output of such converter. As is conventional, each S/H circuit 38, upon being enabled by a strobe signal, loads in and stores for a predetermined interval the signal presented as its input. For this purpose, a pair of strobe signals are selectively applied from the processor 24 under program control along lines 24c and 24d for respective application to the pair of S/H circuits 38.

It will thus be appreciated that the normalized velocity command data made available at any instant of time at the output of D/A converter 40 is supplied to the inputs of both S/H circuits 38 even though such data corresponds to only a selected one of the two movable elements. As will be described in more detail below, the processor 24, upon initial receipt of a signal indicative of the selection of such selected movable element, raises the strobe signal associated with the selected movable element at the appropriate time thereby enabling only the corresponding S/H circuit 38 and thus the multiplication means included therein. In this manner, an appropriate velocity command signal will be applied to the correct serve control system.

As shown in FIG. 1, data tag signals are supplied along a data tag bus 42b to processor 24. These signals can originate from the host controller 42 and servo to identify the character of the data being supplied on the input data bus 42a, i.e. whether the data on the input data bus represents a desired position for movable element 10 to be moved to or rather for movable element 12 to be moved to. It can be said, therefore, that the desired position signal on the input data bus "selects" one of the movable elements for movement to the desired position, and the data tag signal on the data tag bus is indicative of such selection.

As an example, the desired position signal on the input data bus might be a command to move the movable element 10 to a desired position which the processor 24 computes in relation to the movable element's actual position, as derived from the incremental position pulses from the associated pulse generator 22 in the manner alluded to above, to be 11 increments from such actual position. The signal on the data bus would identify the signal on the data bus as being related to movable element 10 and thus representing the "selection" of such movable element for moving. The processor 24 is then programmed to raise the associated strobe signal on line 24d once during each internal cycle thereof until the movable element reaches the desired stopping position, which the processor 24 will detect upon comparison of the actual and desired position signals. Each time the strobe is raised, the normalized velocity command data at the D/A converter output will be loaded into the corresponding S/H circuit 38 and effectively multiplied by $K_1$.

The first time the strobe is raised, the normalized velocity command signal $\sqrt{x_{11}}$ will be loaded in the corresponding S/H circuit 38 and effectively multiplied by constant $K_1$ thereby resulting in an optimum velocity command signal of $K_1 \sqrt{x_{11}}$. As the movable element 10 is moved a distance equal to one increment, the strobe signal may be raised a number of times dependent upon the relation between the internal cycle speed of the processor and the speed of movement of the movable element. Each such time until one full increment of movement has resulted, the normalized velocity command signal $\sqrt{x_{11}}$ will be loaded into the corresponding S/H circuit 38 and multiplied by constant $K_1$.

When movable element 10 has been moved one full increment toward its desired stopping position, thereby leaving 10 increments remaining, an incremental position pulse will be generated in each of the two phase-displaced pulse train outputs of the associated pulse generator 22, thereby indicating the one increment progression, as well as the direction of such progression. Processor 24 is then programmed to update the binary value stored in RAM 62 which is indicative of the actual position of the movable element 10 in the manner above-described. This up-dated actual position signal is then called out of the RAM 62 and compared with the desired position signal, also called out of its storage location in the RAM, to derive an updated address signal, $x_{10}$, representative of the new distance remaining to be traveled. In response to this new address signal, ROM 34 will generate a new normalized velocity command signal, $\sqrt{x_{10}}$. This signal will then be supplied by processor 24 to the D/A converter 40 and then to both S/H circuits where it is loaded only in the appropriate S/H circuit 38 at the raising of the next strobe signal on line 24d. The process is continued for each advancing increment of travel of movable element 10, as shown graphically in FIG. 3, until the desired stopping position, $x_0$, is reached.

Although the above example is with respect to only movable element 10, it should be clear that the same process can be carried out for movable element 12. Thus, in response to the presence of a data tag on bus 42b indicating that the desired position signal on bus 42a is for movable element 12, the processor will start raising a strobe signal on line 24e once during each internal cycle thereof. Of coure, a strobe signal on line 24e will be raised at a different time during the processing cycle than the raising of a strobe signal on line 24d in the event it is desired to move both movable elements at the same time. Correspondingly, the processor is programmed to address ROM 34 in a time-shared fashion so that at the raising of each strobe signal, the proper corresponding normalized velocity command signal will be present at the output of the D/A converter 40 and loaded into the associated S/H circuit 38.

The mode of operation whereby the movement of both movable elements 10 and 12 are controlled at the same time will be discussed in more detail below. It is important to note at this point, however, that the initiation of strobe signals on either line 24d or 24e will not take place unless and until a corresponding data tag signal is first received. Also, and as mentioned above, the processor will stop raising strobe signals as soon as the corresponding movable element reaches its desired stopping position.

Now then, in the above example of moving movable element 10 eleven increments, suppose it is desired to also move movable element 12 eleven increments. If the desired position signal first applied on bus 42a is for movable element 10, the data tag signal identifying such element and concurrently applied on bus 42b will initiate the raising of a strobe signal on line 24d each internal cycle of the processor until the desired position for movable element 10 is reached. Each time a strobe signal is raised, the signal at the output of D/A converter 40 will be loaded into the S/H circuit 38 enabled by the strobe signal. Before the desired position for movable element 10 is reached, a desired position signal for movable element 12 can be applied on bus 42a with an identifying data tag concurrently applied on bus 42b. This tag will initiate the raising of a strobe signal on line 24e each cycle of the processor 24 until eleven increments have been moved.

Following the initial presentation of desired position information with identifying data tags for both movable elements, succeeding processing cycles will result in the successive generation of a strobe signal on line 24d and a strobe signal on line 24e, or visa-versa, depending upon the order of presentation of the desired position and data tag signals on buses 42a and 42b. As indicated above, a strobe signal will no longer be generated when the associated movable element has reached its desired position. In any event, although the raising of two strobes in one processing cycle occurs successively in time, the time is so short (e.g. less than 100µs) as to amount to virtual simultaneous occurrence. Then, by properly time-sharing ROM 34 in relation to the programmed generation of strobe signals, the correct strobe signal will always be raised for the particular normalized velocity command signal presented at the output of D/A converter 40. In this manner, it is possible to generate two sets of velocity command signals simultaneously for respective application to the servo control system 14 and 16 thereby enabling the simultaneous control of the movements of both movable elements 10 and 12.

Figure 3:
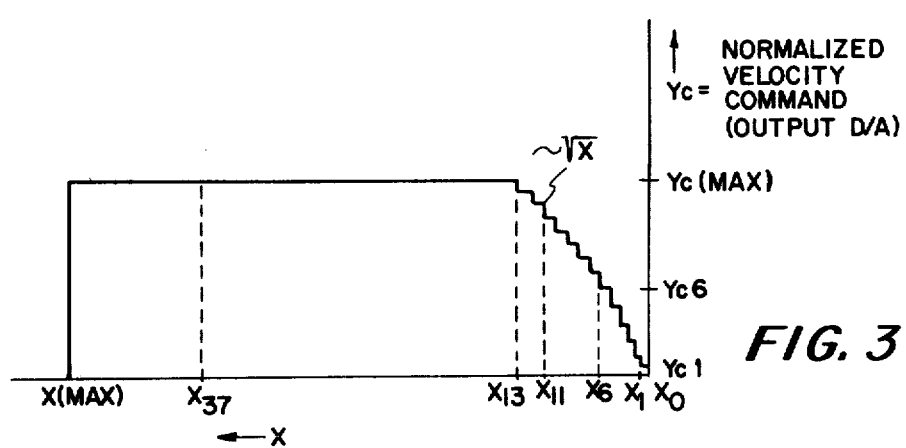
FIG. 3 is a graphical representation of the normalized valocity command signals generated at the output of the D/A converter shown in FIG. 1.

Referring specifically to FIG. 3, it will be noted that the normalized velocity command signal is really an approximation of the value $\sqrt{x}$ in the sense that it is stepped, not continuous. In an effort to approach as closely as possible to the ideal curve $y = K \sqrt{x}$ for each movable element 10 and 12, a smoothing circuit 28 is associated with and coupled to each S/H circuit 38 and has the effect of smoothing out the "bumps" or steps in the curve, as evidenced by the velocity command output of the S/H circuit shown in FIG. 4. Each smoothing circuit may be comprised of any arrangement capable of carrying out the desired function. A preferred smoothing circuit is shown in FIG. 7 and will be described in detail below. At this point, however, it should be noted that each smoothing circuit 28 is, like the S/H circuit 38 to which it is connected, enabled by the associated strobe signal raised by the processor 24. In addition, the actual velocity signal from the associated tachometer 20 is applied as an input thereto.

Velocity command signals supplied from each S/H circuit 38 are coupled to an input of the association mode switch 30 through a conventional ±1 circuit 44. The processor 24, under program control, calculates the requisite direction of travel for each movable element upon a comparison of the associated actual and desired position signals. An appropriate direction command signal (e.g. binary 0 or 1) is then applied along a respective one of lines 24f and 24g to the associated ±1 circuit 44. Any suitable ±1 circuit capable of selectively inverting the data input signal applied thereto may be utilized in accordance with the present invention. At these circuits are entirely conventional, they will not be shown and described in detail herein.

As shown in FIG. 1, the host controller 42 not only transmits signals to processor 24 along the input data bus 42a and the data tag bus 42b, but also receives status signals, preferably in bit parallel format, from the processor along a status bus 24h. Examples of status signals that may be supplied to the controller are:

1. "READY-1" — indicating that the processor is ready to receive a new desired position signal for movable element 10.

2. "READY-2" — same as "READY-1", except applied to movable element 12.

3. "BUSY-1" — indicating that the movable element 10 is currently being moved to a previously desired position and thus the processor is not ready to receive a new desired position signal for movable element 10.

4. "BUSY-2" — same as "BUSY-1", except applied to movable element 12.

5. "CHECK" — indicating that a malfunction has occurred somewhere in the system and thus the processor is not ready to receive any new input data.

6. "COMPLETE OPERATION" — indicating that both movable elements have reached their desired positions and no new desired position data for either movable element has been received.

Figure 4:
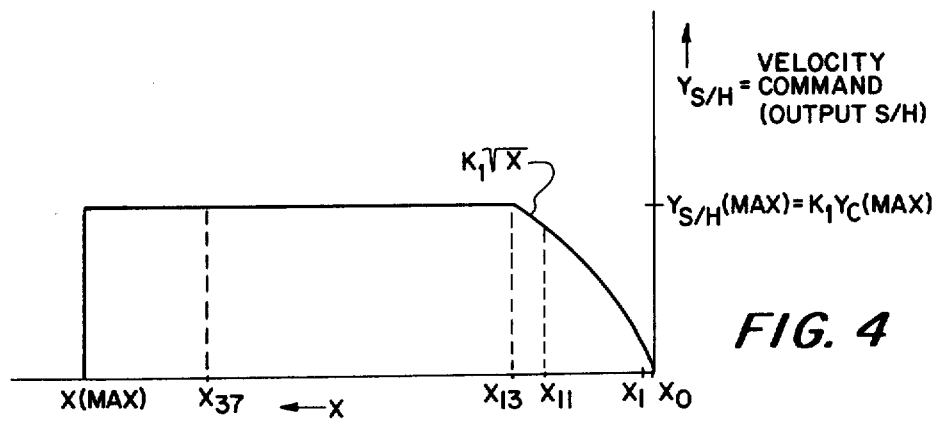
FIG. 4 is a graphical representation of the velocity command signals as generated at the output of a sample-and-hold circuit shown in FIG. 1.
Figure 5:
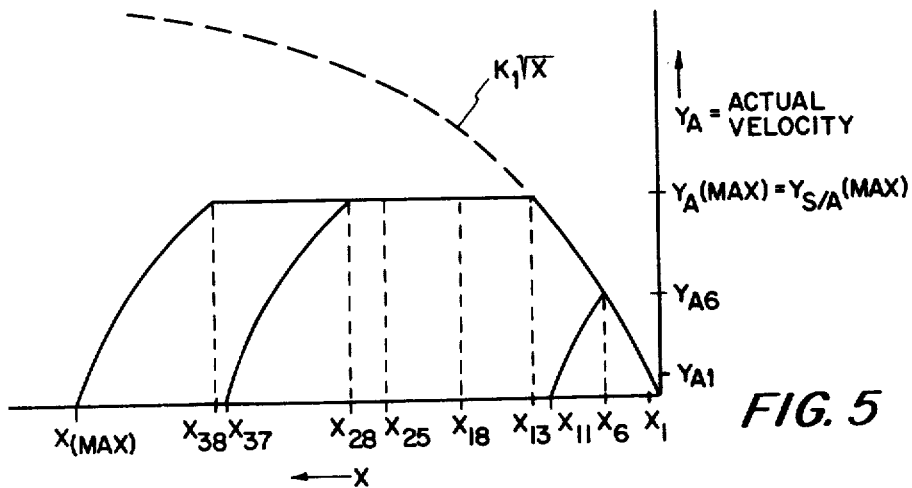
FIG. 5 is a graphical representation of the actual velocity of a movable element moving three exemplary distances to a desired stopping position.

The general operation of the system will now be described with reference to FIG. 1 – 6. If both movable elements 10 and 12 are at rest and there are no malfunctions in the system, "READY-1" and "READY-2" status signals will be applied by the processor 24 to the controller 42 indicating that the processor is ready to receive new input data relative to newly desired positions of both movable elements. Assume first that a signal indicative of a newly desired position for movable element 10 to be moved to is applied in binary digital form and in bit-parallel format along the input data bus 42a. This input signal will be periodically compared (once during each internal processing cycle of the processor 24) with a signal representing the actual position of movable element 10, as derived internally of the processor in the manner above-described. An address signal resulting from each comparison is forwarded under program control to ROM 34. Assume that this signal indicates a required movement of 37 increments of travel. Consequently, a distance $x_{37}$ as shown in FIGS. 3 – 5 must be moved.

Referring to FIG. 3, ROM 34 stores at each of its x(max) through $x_{14}$ memory locations a normalized maximum velocity command signal, i.e. $y_c$ (max),. Thus, with a distance $x_{37}$ to be traveled, the normalized velocity command signals corresponding to movable element 10 that are generated by the ROM will be $y_c$(max) until 13 increments of travel remain. Starting at address location $x_{13}$ and continuing until address location $x_0$, i.e. the desired stopping position, the ROm output will be comprised of decreasing stepped signals, as shown in FIG. 3. All of these signals are normalized velocity command signals supplied by the processor to the D/A converter 40 where they are successively converted into analog form. From the D/A converter, they are supplied to both S/H circuits 38, but are only loaded into that S/H circuit 38 enabled by an associated storbe signal raised by the processor once during each internal cycle thereof. It will be recalled that the raising of such strobe signals is initiated by a data tag signal on bus 42b signifying that the desired position data transmitted on bus 42a is for movable element 10. As indicated above, the S/H circuit 38 includes multiplication means which multiplies the normalized velocity command signal, now shaped by the action of the associated smoothing circuit 28, by the constant $K_1$. The resultant output of the S/H circuit 38 therefore represents a predetermined maximum velocity command, i.e. $Y_{S/H}(max) = K_1 y_c(max)$ for the distances $X_{37} - x_{14}$ and a real time solution of the equation $Y_{S/H} = K_1 \sqrt{x}$ for the distances $x_{13} - x_0$. The velocity-distance profile of the resultant curve is shown in FIG. 4.

Now then, the velocity command signals from the S/H circuit 38 are transferred through the associated ±1 circuit 44 where they are selectively inverted, depending upon the state of the corresponding direction signal from the processor. The velocity command signals from the ±1 circuit are applied through the associated mode switch 30 to the associated summer 26 until one increment remains to be traveled, i.e. distance $x_1$. At this point, the mode control signal changes state under processor control preventing the velocity command signal from being supplied to the summer 26 and supplying instead the selected incremental position signal from the associated position transducer 18, as explained above.

While the movable 10 is being moved the requistie increments, and a few microseconds after the input signal indicating the desires position of movable element 10 is received on the input data bus, the controller 42 may place a signal on the input data bus 42a indicative of a desired position for movable element 12 to be moved to at the same time movable element 10 is moved to its desired position. This is usually the case in high speed serial printers, for example, where the movable elements are comprised by the rotatable print wheel and linearly movable carriage. Appropriate velocity command signals for application to servo control system 16 will be generated in an identical manner to those generated for application to servo control system 14, except now the speciic S/H circuit 38 and smoothing circuit 28 associated with movable element 12 will be employed, as made clear above. For distances less than 14 increments to be traveled, the velocity command signals will represent the real time solution of the equation of motion, $Y_{S/H} = K_2 \sqrt{x}$, whereas for distances of 14 or greater increments to be traveled, the velocity command signals will be $Y_{S/H}(max) = K_2 y_c(max)$.

In order to be able to generate velocity command signals for application to both servo control systems 14 and 16 so that movement of both movable elements 10 and 12 occurs simultaneously, processor 24 operates ROM 34 in a time-shared fashion. Thus, during each internal cycle of the processor, it will compare the actual and desired position signals associated with each movable element and generate an address signal to the ROM 34 resulting from such comparison and representing a digital statement of the distance remaining to be traveled by the respective movable element. The ROM will, in turn, generate the optimum normalized velocity command signal for such remaining distance which the processor will supply to D/A converter 40. At this same time, the appropriate strobe signal will be raised in order to load the D/A converter output signal into the appropriate S/H circuit 38.

Also during each internal cycle, the processor samples the two outputs of each pulse generator 22. An incremental position pulse occurring in a predetermined one of the two outputs corresponds to the movement of the respective movable element one increment in a direction evidenced by the phase differential between that pulse and the corresponding pulse occurring in the other of the two outputs of the pulse generator 22. In response to such sampling, the processor updates the actual position information, calculates a new address signal indicative of the new incremental distance remaining and applies such new address signal to the ROM 34. When both movable elements are moving simultaneously, the processor will detect the change in their respective actual positions successively during each internal processing cycle and address the ROM accordingly in a time-shared fashion. Since the processor operates at speeds far greater than the speed it takes each movable element to move one increment of travel, control of the movements of both movable element occurs simultaneously.

It must again be pointed out at this point that the use of the general equation of motion, $y = K \sqrt{x}$, is merely exemplary, as the processor 24 could be designed to effect a realtime solution to any desired equation of motion applicable to each of the movable elements.

Figure 6:
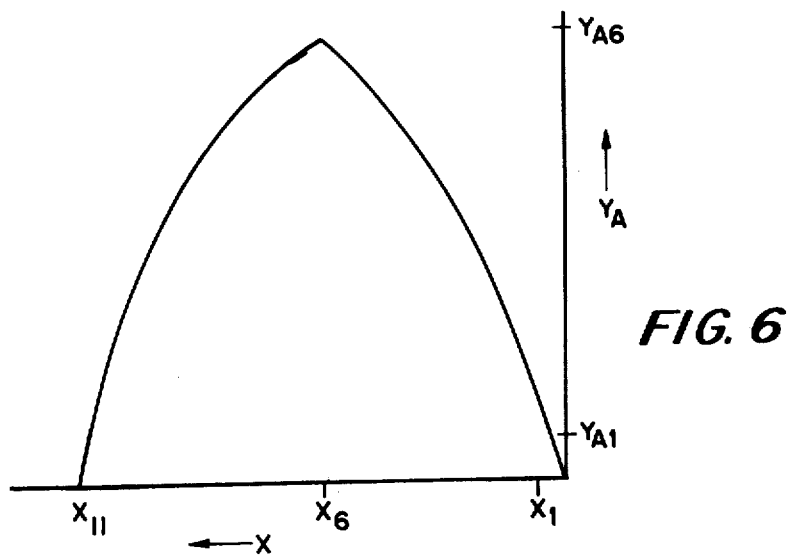
FIG. 6 is a magnification of the acceleration-deceleration profile for a movable element having a distance $x_{11}$ remaining to be traveled upon starting.

Reference is now had to FIGS. 5 and 6 which depict in graphical form the actual velocity signal supplied at the output of the tachometer 20 associated with movable element 10. In FIG. 5, the actual velocity-distance profile for movable element 10 is shown for movement of such element three representative distances, i.e. the maximum possible distance, $x(max)$, a distance equal to 37 increments, $x_{37}$, and a distance equal to 11 increments, $x_{11}$. Since the velocity command signal will be $Y_{S/H}(max) = K_1 Y_c$ for distances remaining greater than 13 increments (see FIG. 4), the movable element will accelerate from a position at $x(max)$ to a maximum actual velocity, $y_a(max) = Y_{S/H}(max)$. This speed will be maintained until a distance $x_{13}$ remains, at which time the velocity command will start to decrease, causing the associated servo control system 14 to correspondingly decrease the actual speed of the movable element. This same relationship is true when the movable element starts at a distance $x_{37}$ from the desired stopping position.

When the movable element 10 starts at a distance $x_{11}$ from the desired stopping position, the first velocity command signal will be $K_1 \sqrt{x_{11}}$ causing the movable element to accelerate. Acceleration will continue as the movable element draws closer to its desired stopping position until its actual velocity equals the velocity command signal optimum for its present position. This is shown in FIG. 5 as occuring, by way of example, at a distance $x_6$ remaining to be traveled where the acceleration curve intersects the optimum deceleration curve defined by $K_1 \sqrt{x}$. From a distance remaining of $x_6$, the actual velocity of the movable element 10 will be controlled by servo control system 14 to substantially follow the curve represented by $K_1 \sqrt{x}$.

As indicated earlier, each exemplary servo control system 14 and 16 is shown as being of the dual-mode type which switches from a non-linear mode to a linear mode when the associated movable element is within a predetermined distance, for example one increment of travel, from its desired stopping position. Thus, from a remaining distance of $x_1$ to the desired stopping position, $x_0$, movement of the applicable movable element is controlled in a linear manner by comparing the selected incremental position signal from the associated position transducer 18 with the actual velocity signal from the associated tachometer 20. FIG. 6 shows the actual velocity of movable element 10 when moved from a remaining distance $x_{11}$ to the desired stopping position wherein the curve follows a substantially linear path from a remaining distance of $x_1$ to the desired stopping position $x_0$. The actual velocity of movable element at distance $x_1$ is represented by $y_{a1}$, whereas the maximum valocity attained by the movable element is $y_{a6}$, which occurs at a remaining distance of $x_6$.

Figure 7:
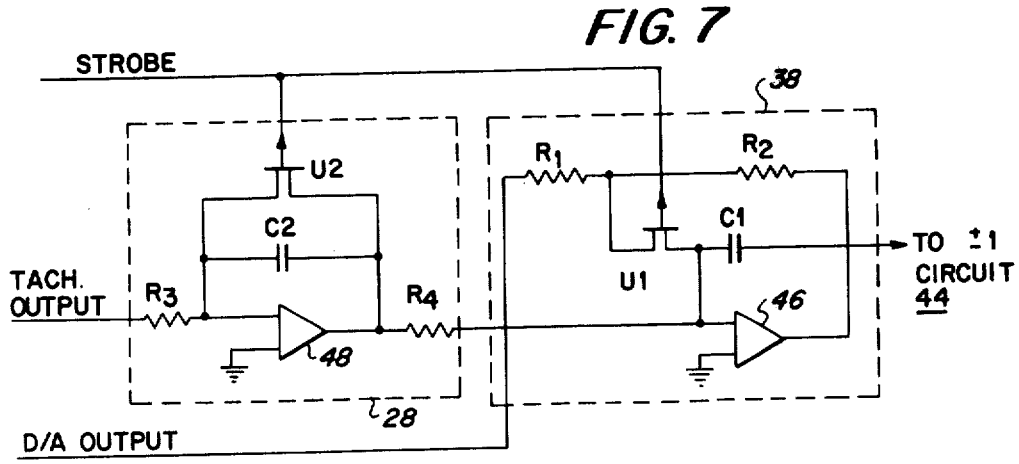
FIG. 7 contains circuit diagrams of the preferred smoothing circuits and sample-and-hold circuits for use in the system of FIG. 1.

Reference is now made to FIG. 7 which shows an exemplary smoothing circuit 28 and S/H circuit 38 for use in the apparatus of the present invention. The S/H circuit 38 includes a first resistor $R_1$ coupled at one end to the output of D/A converter 40 (FIG. 1). The other end of resistor $R_1$ is coupled to one end of a second resistor $R_2$ and to the source electrode of a field-effect-transistor $U_1$. The drain electrode of transistor $U_1$ is coupled to one plate of a capacitor $C_1$ and to the input terminal of an operational amplifier 46. The other input of the operational amplifier 46 is grounded and its output is coupled to the other plate of capacitor $C1$, the other end of resistor $R_2$ and the input of the associated ±1 circuit 44. The gate electrode of transistor $U_1$ is coupled to the corresponding strobe signal line from processor 24.

In operation, when a strobe signal occurs at the gate electrode of transistor $U_1$, it causes the transistor to turn on thereby enabling the capacitor $C_1$ to charge to a voltage represented by the output voltage of D/A converter 40 multiplied by a constant defined by the ratio $R_2/R_1$, which represents the gain of the circuit. The multiplication means heretofore alluded to therefore constitutes, in this exemplary circuit, the resistors $R_1$ and $R_2$. It is clear that any constant could be defined simply by selecting appropriately valued resistors. This is how the constants $K_1$ and $K_2$ above referred to are defined.

In order that the output signal represent as closely as possible the real time solution of an equation of motion for each movable element, i.e. $y = K_1 \sqrt{x}$ and $y = K_2 \sqrt{x}$, a smoothing circuit 28 is coupled to the input of amplifier 46. In the exemplary smoothing circuit, shown in FIG. 7, the strobe signal applied to transistor $U_1$ is also applied to the gate electrode of a second field-effect-transistor, $U_2$. The source electrode of this transistor is coupled through a resistor $R_3$ to the output of the associated tachometer 20 and to an input of a second operation amplifier 48. The other input of amplifier 48 is grounded. The drain electrode of transistor $U_2$ is coupled to the output of amplifier 48 which is, in turn, coupled to the input of amplifier 46 of S/H circuit 38 through a coupling resistor $R_4$. A second capacitor $C_2$ is provided in the feedback path of amplifier 48 and is thus coupled between the source and drain electrodes of transistor $U_2$.

In operation, capacitor $C_2$ is reset upon each occurence of a strobe signal, which turns on transistor $U_2$ thereby shorting the capacitor $C_2$. Following the occurence of each strobe signal, the capacitor charges up to a voltage proportional to the output of tachometer 20 and the time interval between the strobe signal just occured and the next succeeding strobe signal. the resultant output signal of amplifier 48 is coupled through resistor $R_4$ and may be designated as the smoothing signal. Since it is proportional to the tachometer output signal and is applied along with the velocity command signal ($K \sqrt{-x}$ is stepped fashion — see FIG. 3) at such input, it has the effect of smoothing out the profile of such signal over a particular distance, as noted in FIG. 4.

Before describing the general make-up of processor 24, it must again be made clear that processor 24 can be comprised of any hardware and/or software capable of carrying out the desired control functions and memory storage functions. Thus, processor 24 could be comprised entirely of a hard-wire system, partly of a hard-wire system and partly of programmed hardware, or entirely of programmed hardware. Whatever the make-up of processor 24, it should include, in accordance with the present invention, a means responsive to a first signal representative of the distance to be traveled by a selected one of a plurality of movable elements from its actual position to a desired stopping position for generating a second signal (velocity command signal) proportional to a predetermined optimum velocity of movement for each of the plurality of movable elements when required to be moved a distance represented by the first signal; and a means coupled to each of a plurality of multiplication means respectively associated with the plurality of movable elements and responsive to a third signal representative of the selection of the selected movable element for enabling the multiplication means associated with the selected movable element.

Processor 24 is preferably a programmed microprocessor having the general layout depicted in FIG. 8. As shown, processor 24 includes a data input section 50 for receiving the incremental position pulses supplied from the two pulse generators 22 along lines 22a and 22b, respectively, as well as the input data (desired position signals) and data tags supplied along the input data and data tab buses 42a and 42b, respectively, from the controller 42. Data input section 50 therefore comprises apropriate interface circuitry (not shown) which includes a suitable data assembler capable of assembling incoming data into a format usuable by the processing and arithmetic section 36 of the processor 24, to which such data is forwarded along an appropriate bus 52.

An exemplary data assembler may include a plurality of multi-bit registers (not shown), each of which is capable of loading in an input signal applied thereto along the data bus 42a upon receipt of a load command as applied along a bus 53 from a program control and storage section 54 of the processor 24. The input signal applied along bus 42a is routed into a predetermined one or more of the registers upon receipt of the corresponding data tag signal along the data tag bus 42b, which latter signal acts as a routing signal. In the case of an incremental position pulse applied along one of the lines 22a and 22b, such pulse is latched and placed ino an appropriate register. The processor resets the latch (not shown) after receipt of the pulse is acknowledge by the processor.

Referring to FIGS. 8 and 9, the processing and arithmetic section 36 typically may include one or more operand registers (e.g. a pair of operand registers 64 and 66), an arithmetic logic unit (ALU) 68 and one or more random access memory (RAM) units (e.g. the RAM 62). The operand register 64 is coupled to the bus 52 for receiving data presented thereon from the data input section 50. This data is loaded into the register 64 under program control, i.e. in response to a load command presented at a command input terminal A from a program decode unit 70 included in the program control and storage section 54. The program decode unit 70 comprises the instruction decode circuits (not shown) of the processor 24.

Both operand registers 64 and 66 are coupled to a bus 72 for receiving data presented thereon from the RAM 62. This data may include the binary values of actual position and desired position for each movable element, as stored as corresponding address locations in the RAM, as well as the binary value of the difference remaining to be traveled by each movable element, which may also be stored at an address location in the RAM. Data is loaded into and recovered from corresponding address locations in the RAM in response to appropriate command signals presented at a plurality of command terminals D (only one shown for clarity) from the program decode unit 70.

The operand register 64 is further coupled to a bus 74 for receiving data presented thereon from the ROM 34 which is also included in the program control and storage section 54. This data will include the normalized velocity command signals generated by the ROM 34, as described above. The section 54 also includes a conventional program counter 76 coupled to an output bus 78 from the operand register 66. Information transmitted along the bus 78 includes the ROM address signals which are forwarded to the rom 34 along a bus 80 from the program counter 76 when a branch instruction is to be executed. The output of the ROM 34 is also coupled along a bus 82 to the program decode unit 70 for the purpose of providing control and sequencing signals to each of the processor elements shown in FIG. 9.

The ALU 68 is adapted to receive data presented thereto along a bus 84 from the operand register 64 and along a bus 86 from the operand register 66. The ALU may be of any conventional variety capable of carrying out one or more desired arithmetic functions and operations under program control. The particular arithmetic function or operation to be carried out at any instant of time is determined by a command signal presented at a command input terminal C from the program decode unit 70. It will be noted that the program decode unti 70 also generates appropriate noted that the program decode unti 70 also generates appropriate command signals for respective application to the command input terminals B, E and F of the operand register 66, program counter 76 and ROM 34, respectively, to control the operation thereof in accordance with the program, which will be discussed in more detail below in connection with FIGS. 10A - 10E.

The resultant of each operation carried out by the ALU 68 is supplied along an appropriate bus 88 to the RAM 62 where it is stored at a predetermined address location under program control. Typical of the operaions carried out by the ALU 68 are to compare actual position information, as supplied from the RAM 62 along bus 72 to operand register 64 and then from that register to the ALU along bus 84, with desired position information, as supplied from the RAM 62 along the bus 72 to operand register 66 and then from that register to the ALU along bus 86. It will be noted that the desired position information was originally entered into operand register 64 from the data input section 50 and then forwarded by the ALU 68 along bus 88 where it was stored at a predetermined address location. In this context, the ALU performs merely a gating function. The result of each comparison of actual and desired position information, which constitutes a ROM address signal, is loaded into the RAM 62 at a predetermined address loaction and then called out under program control and forwarded along bus 72, through operand register 66, along bus 78, through program counter 76 and along bus 80 to the ROM 34.

Output data from the processing and arithmetic section 36, which includes the normalized velocity command signals generated from the ROM 34 and loaded into operand register 64 after being supplied thereto along bus 74, is applied along a bus 56 from the register 64 to a plurality of command data latches (not shown) included in an output latch section 58 of the processor 24. These data latches are selectively set in response to the input applied thereto and are reset under program control by appropriate command signals applied along an appropriate bus 60 from the program decode unit 70. The command data outputs from these latches are supplied along the bus 24c to the D/A converter 40 (see FIG. 1).

The program decode unit 70 also generates signals which are supplied on bus 60 to the output latch section 58 to selectively set or reset a pair of mode control latches, a pair of direction latches and a pair of strobe latches (all not shown) in order to selectively apply mode control, direction and strobe signals to respective portions of the system of FIG. 1. In addition, command signals are applied on bus 60 to corresponding ones of a plurality of status latches (not shown) coupled to the status bus 24h in order to apply appropriate status signals to the controller 42.

The specific circuits used in the various sections of the processor 24 are deemed to be of conventional variety and manufacture, and thus will not be described in detail herein. Further, it must be again pointed out that the processor 24 as depicted in FIG. 8 and 9 is merely exemplary. Any suitable data processor capable of being programmed to carry out the required functions of the present inventions may be employed. There are a number of commercially available microprocessore that could be used and an example of one if the INTEL 8080 microprocessor manufactured by the Intel Corporation of Santa Clara, California.

It was stated earlier that the movable elements 10 and 12 could respectively comprise a rotatable print wheel and a linearly movable carriage of a high speed serial printer. The specific circuits of a microprocessor specially suited for use in such a printer in order to carry out the present invention is disclosed for informational purposes in Appendices A, B and C to this application. more specifically, Appendices A and B together depict preferred circuits for the data input section 50 wherein the preferred data assembler thereof is constituted by the registers labelled A37, B37, C37, D37, E37 and F37. Appendix C depicts preferred circuits for the processing and arithmetic section 36, the program control and storage section 54 and the output latch section 58. The following table shows how the circuit components of Appendix C correspond to various elements of the processor 24 as shown in FIGS. 8 and 9.

| Elements - Figs. 8 and 9 | Components - Appendix C |
| --- | --- |
| operand register 66 | C61 and C73 |
| operand register 64 | H61 and H73 |
| ALU 68 | E61 and E73 |
| program counter 76 | A50, H61 and one-half of B38 |
| RAM 62 | E50, F50, E38 and F38 |
| ROM 34 | F70, C22 and A22 |
| program decode 70 | A73, D14, D25 and portions of B50, A38, E14, H38, E25, G50, B61 et. al. |
| output latch section 50 | F25, F14, G25, G14 and B73 |

It should be noted that PROM F70 depicted in Appendix C is utilized to develop desired position data for the print wheel. More specifically, input data relating to the print wheel that is applied on the input data bus 42a is typically an ASCII coded signal representative of a character to be printed. This signal is applied to the PROM F70 which generates a binary signal indicative of the spoke position for that character, i.e. a desired position signal. Desired position signals for the carriage are applied directly from the controller 42 to the processor along the input data bus 42a.

It must further be noted that each of the circuit components listed in the above table are commercially available from the Texal Instruments Corporation (TI) of Dallas, Texas and are labelled with applicable TI part numbers (each beginning with the number 74). Various other of the components depicted in Appendices A – C are commercially available from either TI, in which event they are labelled with applicable TI part numbers, or National Semi-Conductor Corporation (NSC) of Mountain View, California in which event they are labelled with applicable NSC part numbers (each beginning with the number 88).

Returning now to the processor as depicted in FIGS. 8 and 9, in order to more clearly understand the operation thereof and its various sections (50, 36, 54 and 58) relative to the generation of normalized velocity command signals, as well as mode control, direction, strobe and status signals, reference is had to the flow charts depicted in FIGS. 10A-10E.

Figure 10A:
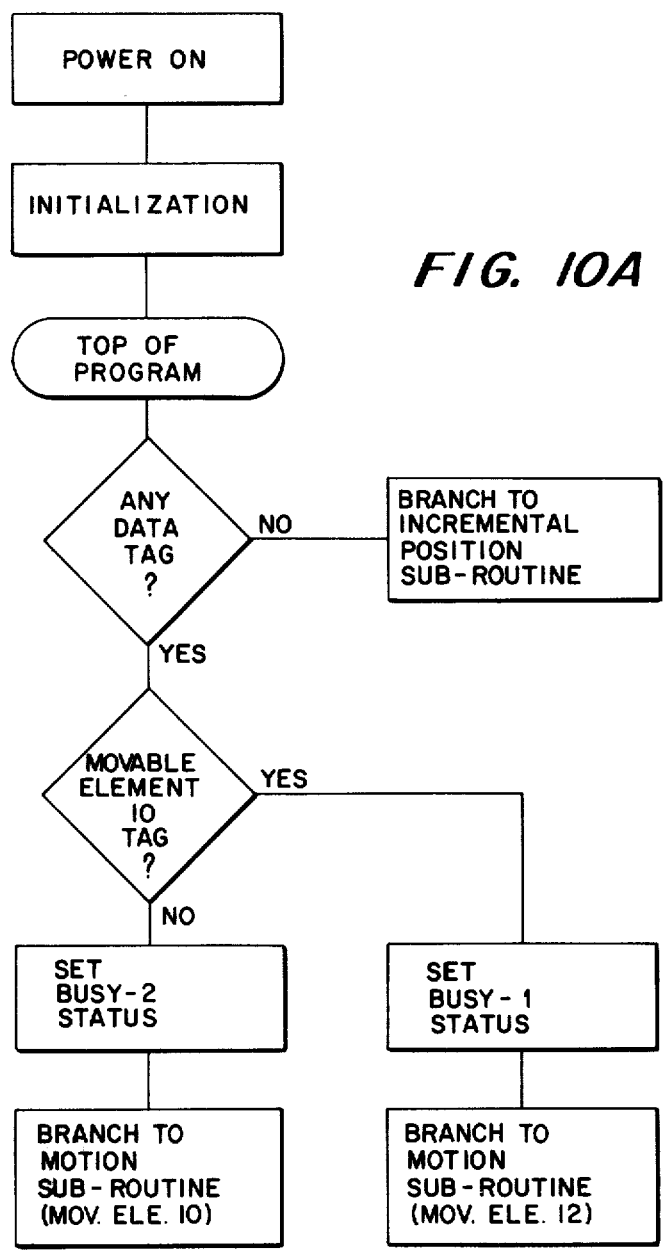
FIGS. 10A - 10E are flow charts depicting the sequence of operation of the processor of FIGS. 1, 8 and 9 relative to the generation of normalized valocity command signals and other control signals for use in the system of FIG. 1.
Figure 10B:
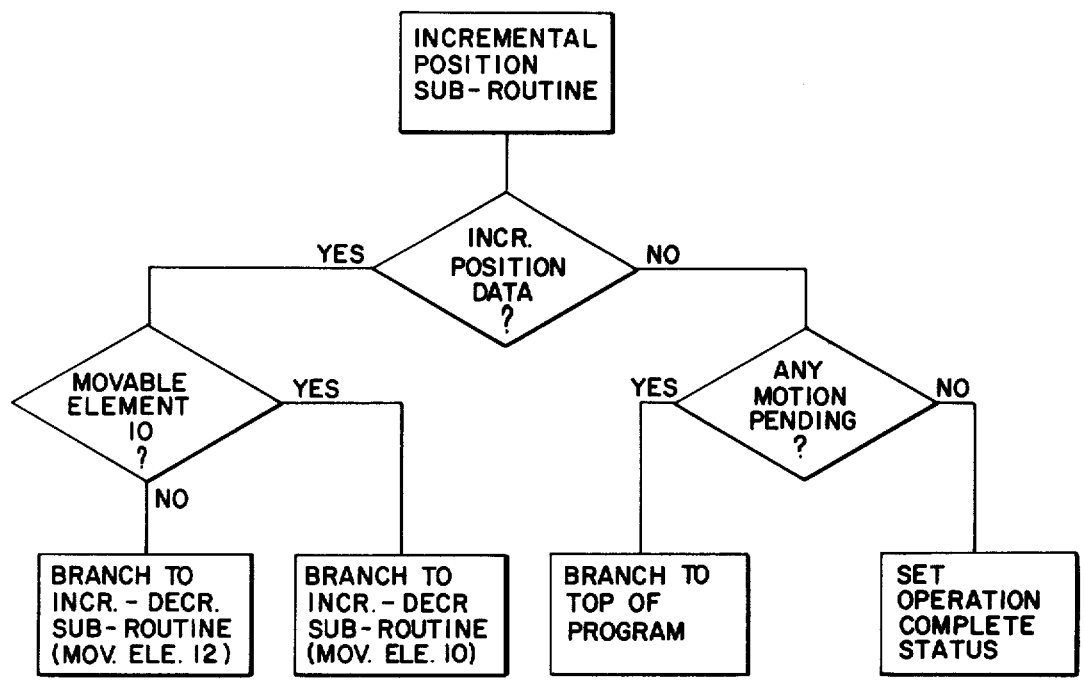

Referring to FIG. 10A, when power is applied to the system of FIG. 1 and, in particular, to the processor 24, the processor first "initializes" itself by resetting all registers and memory devices to zero. Then, the processor initializes the movable elements 10 and 12 in the manner above-described, i.e. the movable elements are moved to predefined reference, or incremental zero, positions. Following initialization, the processor commences operation in accordance with the program.

The processor first looks for a data tag signal on the data tag bus 42b (FIG. 1). If no data tag signal is present, the processor branches to an incremental position sub-routine which will be described below in connection with FIG. 10B. If a data tag signal is present on the data tag bus, the processor askc first whether it relates to movable element 10. If yes, the processor sets the "BUSY-1" status latch in the output latch section 58 thereby causing a "BUSY-1" status signal to be applied on bus 24h to the controller 42. If no, the data tag must obviously be for movable element 12 and thus the processor sets the "BUSY-2" status latch to supply a "BUSY-2" status signal to the controller 42. Following setting the appropriate BUSY status latch, the processor branches to a motion sub-routine for the particular movable element which will be described below in connection with FIG. 10D.

As indicated above, if the processor fails to detect a data tag signal, it will branch to an incremental position sub-routine. That sub-routine will now be described with reference to FIG. 10B. The processor first looks for incremental position pulses occurring in the predetermined pulse train output of each pulse generator 22. If no position pulse has occurred, the processor inquires whether there is any motion pending, i.e. whether either movable element 10 or 12 still have to be moved to a desired position. If not, the processor sets an OPERATION COMPLETE status latch in the output latch section to supply an OPERATION COMPLETE status signal to the controller 42 on bus 24h. If there is some motion pending, the processor branches to the top of the program. If an incremental position pulse has occurred during the time the processor is searching, the processor inquires as to whether it relates to movable element 10. If yes, the processor branches to an increment-decrement sub-routine for movable element 10. If no, the pulse must have been related to movable element 12 and so the processor branches to an increment-decrement subroutine for movable element 12.

Figure 10C:
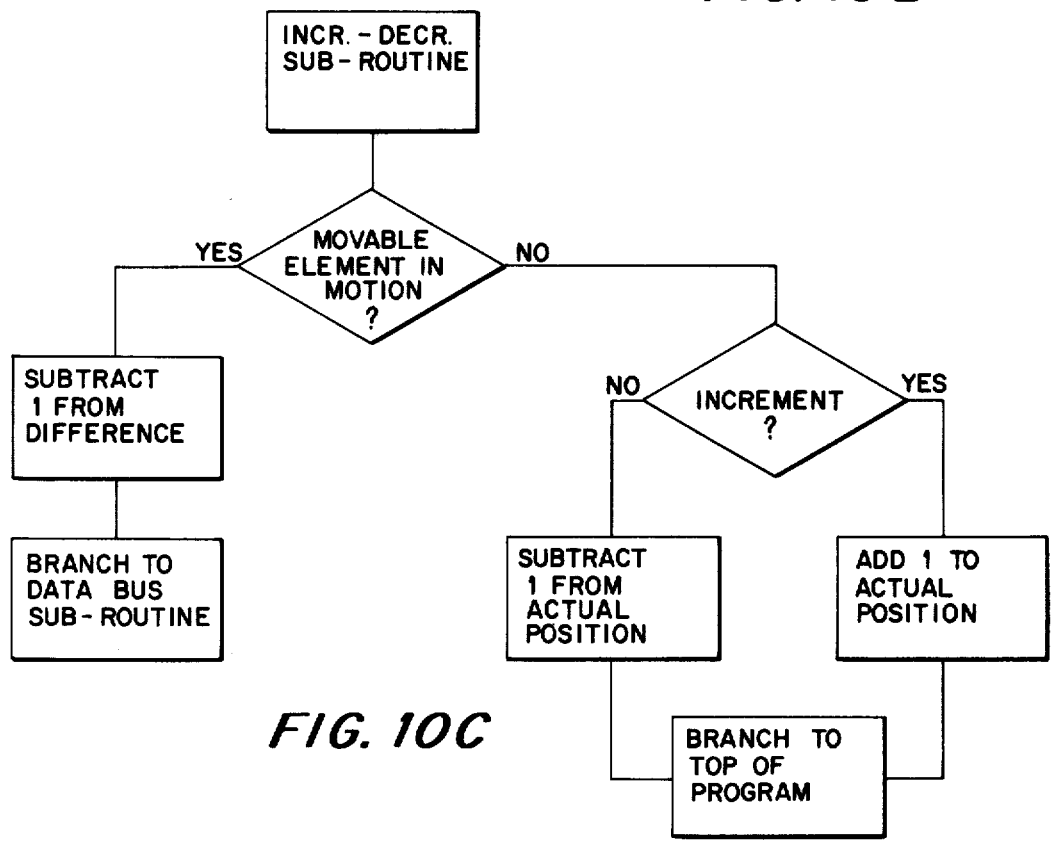

The increment-decrement sub-routine will now be described with reference to FIG. 10C. First, the processor asks whether the movable element for which the sub-routine is being carried out is in motion, i.e. whether it is being moved automatically under program control to a desired position. If no, it means that the incremental position pulse was detected as the result of a manual movement of the movable element. In this event, the processor compares the phase differential between the incremental position pulse detected and the corresponding pulse generated at the other output of the respective pulse generator 22 to determine the direction of travel. If the direction of travel is such that the actual position data stored in the RAM 62 should be incremented, then the processor adds one (1) to such actual position data. If movement was in the opposite direction, then one (1) is subtracted from the actual positon data. After this operation, i.e. incrementing or decrementing by one, the procesor branches to the top of the program. If the respective movable element was "in motion" when the incremental position pulse occurred, then one (1) is subtracted from the difference remaining data, i.e. address for ROM 34, stored in the RAM 62. Following this operation, the processor branches to a data but sub-routine, which will be described below in connection with FIG. 10E.

Figure 10D:
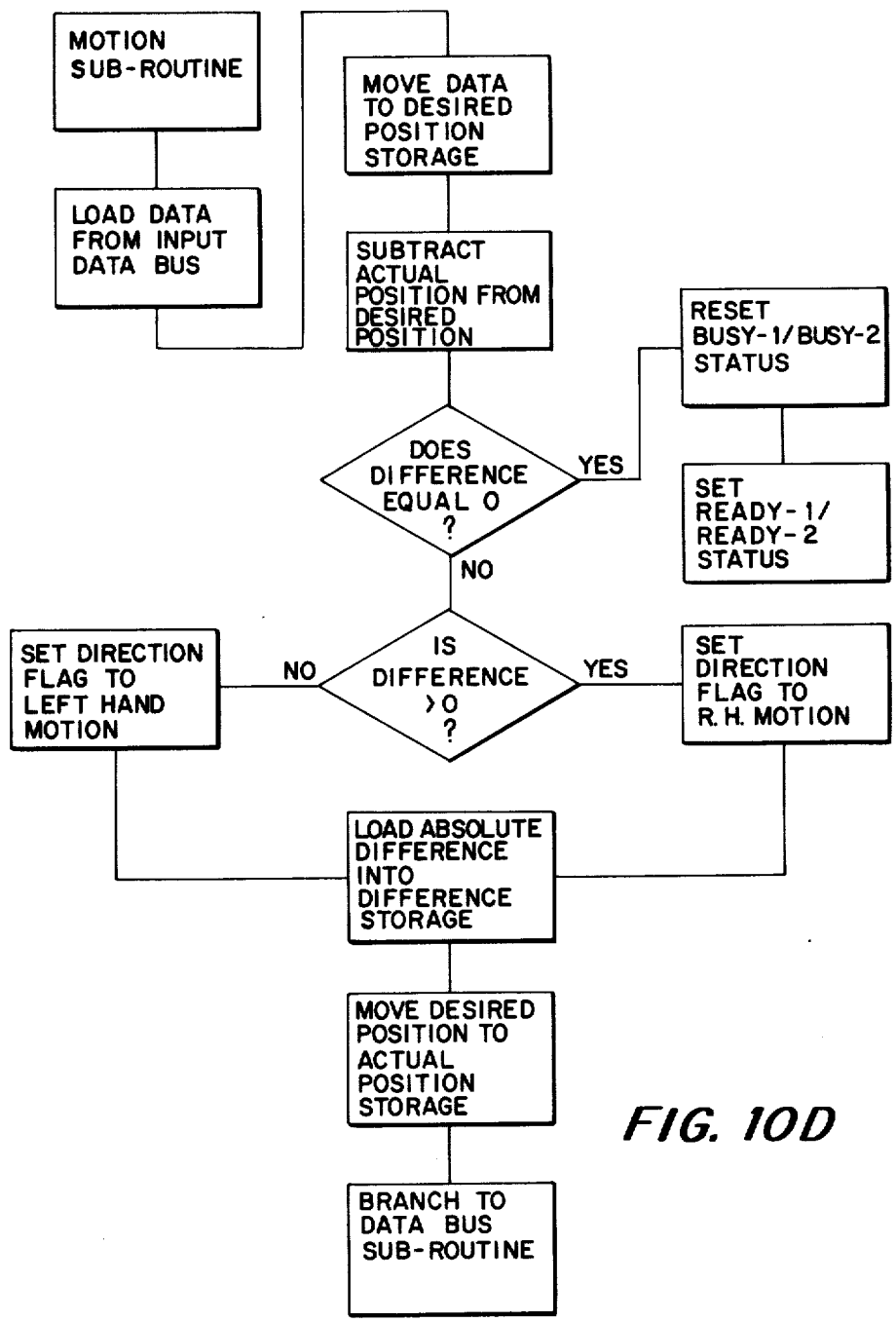

Reference is now had to FIG. 10D wherein the motion sub-routine alluded to above in connection with FIG. 10A will be described. As will be recalled, the processor branches to a motion sub-routine when a data tag signal relating to the respective movable element has been detected and the corresponding BUSY latch set. Now then, and in accordance with the motion sub-routine, the desired position data corresponding to the detected data tag and previously loaded into the data assembler portion of the input data section 50 from the data input bus 42a, is loaded from the data assembler to the operand register 64. From there, the data is loaded into and stored at a predetermined address location in the RAM 62. Then, the processor calls both desired and actual position data out of RAM 62 in order for the ALU 68 to subtract the actual position data from the desired positive data.

Figure 10E:
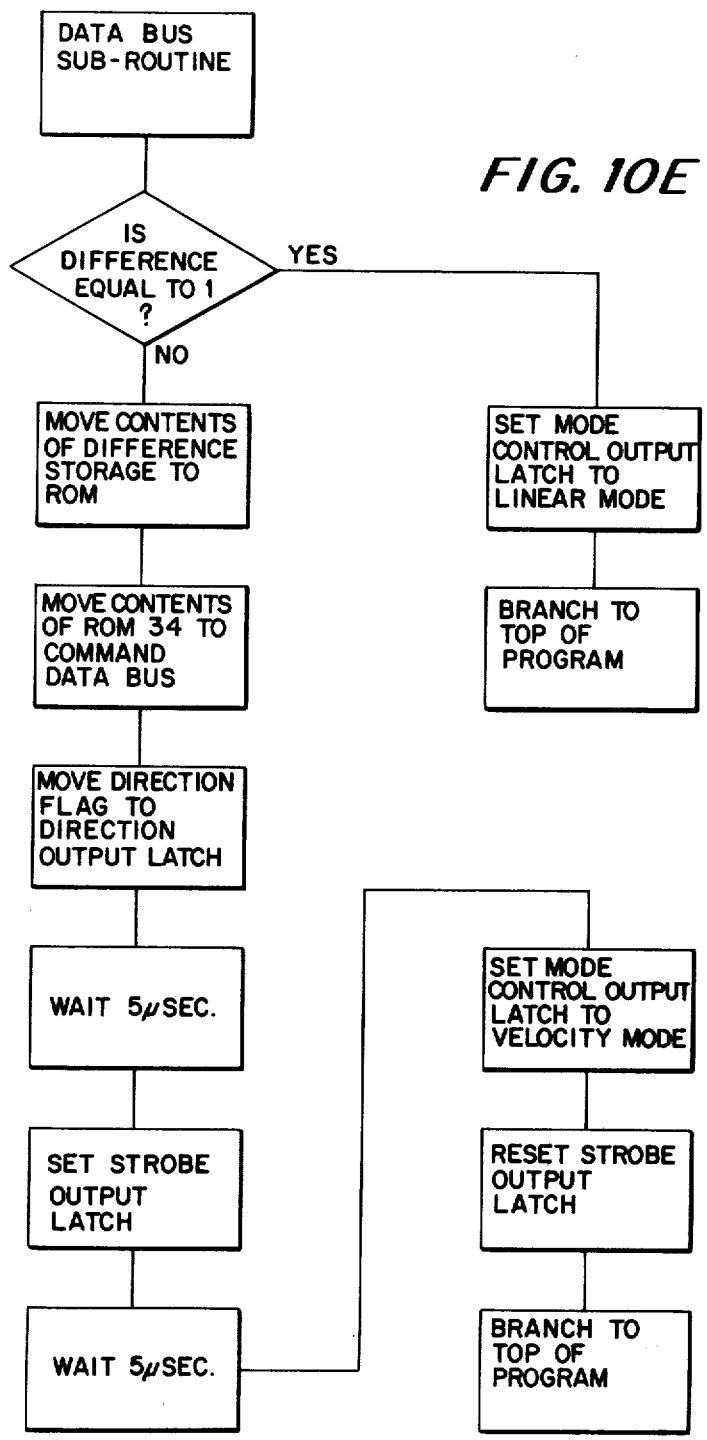

The processor then asks whether the difference between actual and desired positions, i.e. distance remaining address for ROM 34, is equal to zero. If so, the respective BUSY status latch is reset and READY latch set. If no, the processor asks whether the difference is greater than zero. If yes, then a direction flag, to be discussed in more detail below in connection with FIG. 10E, is set to "right-hand" motion. If no, the direction flag is set to "left-hand" motion. After the direction flag is so set, the absolute value of the difference between actual and desired position data is loaded in a predetermined address location in the RAM 62. Following this operation, the processor branches to the data bus sub-rountine.

Reference is now had to FIG. 10E wherein the data bus sub-routine, referred to in connection with FIGS. 10C and 10D, will be described. In accordance with this sub-routine, the processor first asks whether the difference between actual and desired position data equals one (1). If yes, the processor sets the mode control latch in section 58 to a linear mode in order that the selected incremental position signal output of the respective transducer 18 be applied through the respective mode switch 30 to the respective summer 26 (FIG. 1). Following this, the processor branches again to the top of the program. If the difference between actual and desired position data is not equal to one (1), the processor causes the difference data to be inputted as an address signal to the ROM 34. Thereafter, the corresponding normalized velocity command signal is placed on the command data bus 24c.

Following the latter operation, the direction flag referred to above in connection with FIG. 10D is moved to the direction output latch thereby setting it, e.g. set to binary zero (0) for right-hand movement and binary one (1) for lefthand movement. The output of this latch is applied from the output latch section 58 along the corresponding bus 24f or 24g to the corresponding ±1 circuit 44. After the direction flag is so moved, the processor waits 5 microseconds and then sets the corresponding strobe latch in the section 58 to apply a strobe signal along the corresponding line 24d or 24e to the corresponding S/H circuit 38. Following another 5 microsecond delay, the processor sets the corresponding mode control output latch to the velocity mode and resets the strobe output latch. Thereafter, the processor branches again to the top of the program.

The above program sequence is merely exemplary, as it is obvious that other suitable programs could be employed. As an example of a particular program especially suited for use, with the specific microprocessor disclosed in Appendices A - C in order to carry out the desired control operations in a high speed serial printer having a rotatable print wheel and linearly movable carriage, reference is had to the program listing set out in Appendix D.

Although the present invention has been described with respect to a presently preferred embodiment, it will be appreciated by those skilled in the art that various modifications, substitutions, etc. may be made without departing from the spirit and scope of the invention as defined in the appended claims.

What is claimed is:

1. Apparatus for generating a velocity command signal representing a predetermined optimum velocity of movement of a selected one of a plurality of movable elements from its actual position to a desired stopping position, said apparatus comprising:

means responsive to a first signal representative of the distance to be traveled by said selected movable element from its actual position to a desired stopping position for generating a second signal proportional to a predetermined optimum velocity of movement of each said plurality of movable elements when required to be moved a distance represented by said first signal;

a plurality of multiplication means respectively associated with said plurality of movable elements, each multiplication means being coupled to said means for generating a second signal and being capable when enabled of multiplying said second signal by a constant representative of the particular motion characteristics of the associated movable element in order to form a velocity command signal representing the predetermined optimum velocity of movement for said associated movable element; and means coupled to each of said plurality of multiplication means and responsive to a third signal representative of the selection of said selected movable element for enabling the multiplication means associated with said selected movable element.

2. The apparatus of claim 1, wherein said means for generating a second signal includes a memory having a plurality of addressable storage locations, each location storing the normalized solution of the velocity term in the selected movable element's describing equation of motion for a particular distance to be traveled by said selected movable element.

3. The apparatus of claim 2, wherein each location of said memory stores the normalized solution of the velocity term in each movable element's describing equation of motion for a particular distance to be traveled by any of said movable elements.

4. The apparatus of claim 3, wherein said memory includes a read-only memory.

5. The apparatus of claim 2, wherein said describing equation of motion is $y = K\sqrt{x}$, where $x$ is the distance to be traveled by said selected movable element from its actual position to said desired stopping position, K is a constant defining the particular motion characteristics of said selected movable element and y is the predetermined optimum velocity of movement of said selected movable element for the particular distance to be traveled.

6. The apparatus of claim 2, wherein said normalized solution is $\sqrt{x}$, where $x$ is the distance to be traveled by said selected movable elememt between its actual postion and said desired stopping position.

7. The apparatus of claim 5, wherein said normalized solution is $\sqrt{x}$.

8. The apparatus of claim 7, wherein said addressable memory includes a read-only memory.

9. The apparatus of claim 1, wherein said first and second signals are binary digital signals.

10. The apparatus of claim 9, further comprising a digital-to-analog converter coupled between said means for generating a second signal and said plurality of multiplication means for converting said second signal from digital to analog format and supplying it to each of said multiplication means.

11. The apparatus of claim 10, further comprising a plurality of sample-and-hold circuits respectively associated with said plurality of movable elements, each sample-and-hold circuit being coupled to the output of said digital-to-analog converter and including a respective one of said plurality of multiplication means therein, each sample-and-hold circuit being enabled by said means for enabling the multiplication means for loading the output signal from the digital-to-analog converter therein.

12. The apparatus of claim 11, wherein said second signal decreases in steps as said selected movable element is moved toward said desired stopping position.

13. The apparatus of claim 12, further comprising a plurality of smoothing circuits respectively coupled to said plurality of sample-and-hold circuits, each smoothing circuit including means for modifying the signal applied to the respective sample-and-hold circuit from said digital-to-analog converter in order that the profile of actual velocity versus distance be substantially continuous thereby substantially representing the real time solution of said selected movable elememt's describing equation of motion.

14. The apparatus of claim 13, further comprising means coupled to each sample-and-hold circuit for selectively inverting the output thereof.

15. The apparatus of claim 14, wherein each of said multiplication means includes resistor means.

16. The apparatus of claim 14, wherein said means for generating a second signal includes a memory having a plurality of addressable storge locations, each location storing the normalized solution of the velocity term in each movable element's describing equation of motion for a particular distance to be traveled by any of said movable elements.

17. The apparatus of claim 16, wherein said selected movable element's describing equation of motion is $y = K\sqrt{x}$, where $x$ is the distance to be traveled by said selected movable element from its actual position to said desired stopping position, K is a constant defining the particular motion characteristics of said selected movable element and y is the predetermined optimum velocity of movement of said selected movable element for the particular distance to be traveled.

18. Apparatus for generating a plurality of velocity command signals each representing a predetermined optimum velocity of movement of a respective one of a plurality of movable elements from its actual position to a desired stopping position, said apparatus comprising:

addressable memory means responsive to a plurality of first signals each representative of the distance to be traveled by a respective one of said movable elements from its actual position to a desired stopping position for generating a corresponding plurality of second signals, each second signal being proportional to a predetermined optimum velocity of movement for each of said movable elements when required to be moved a distance represented by the corresponding first signal;

a plurality of multiplication means respectively associated with said plurality of movable elements, each multiplication means being coupled to said addressable memory means and being capable when enabled of multiplying a second signal applied thereto by a constant representative of the particular motion characteristics of the associated movable element in order to form a velocity command signal representing the predetermined optimum velocity of movement for said associated movable element; and means coupled to each of said plurality of multiplication means and responsive to a plurality of third signals respectively identifying said plurality of movable elements for enalbing said plurality of multiplication means.

19. The apparatus of claim 18, wherein said addressable memory means ia time-shared relative to the application thereto of said plurality of first signals whereby said plurality of second signals are generated successively in time, said means for enabling the multiplication, means including means for enabling each multiplication means only when a second signal corresponding to the movable element associated with such multiplication means is presented to such multiplication means.

20. The apparatus of claim 19, wherein said means for enabling said multiplication means includes a programmed general purpose data processor.

21. The apparatus of claim 20, wherein said addressable memory means is included in said data processor.

22. The apparatus of claim 21, wherein each multiplication means is included in a sample-and-hold circuit coupled to the output of said addressable memory means and is enabled by said data processor upon the enabling of said sample-and-hold circuit.

23. The apparatus of claim 22, wherein each sample-and-hold circuit includes normally-off switch means coupled in circuit with resistor means, said resistor means defining the multiplication means included in such sample-and-hold circuit, said switch means being turned on in response to a command signal received thereby.

24. The apparatus of claim 23, wherein said data processor includes means for generating a plurality of strobe signals during each internal processing cycle thereof, each strobe signal defining the command signal for turning on the switch means of a respective sample-and-hold circuit thereby enabling such circuit and the multiplication means included therein.

25. The apparatus of claim 20, wherein said data processor includes means for comparing a fourth signal representative of the actual position of a movable element selected for movement with a fifth signal representative of the desired position to which said selected movable element is to be moved for generating a corresponding first signal.

26. In a system for controlling the movements of a plurality of movable elements, said system including a plurality of servo control means respectively associated with and coupled to said plurality of movable elements, each servo control means utilizing velocity command data as a reference input, apparatus for generating a velocity command signal representing a predetermined optimum velocity of movement of a selected one of said plurality of movable elements from its actual position to a desired stopping position, and means for applying said velocity command signal as a reference input to the servo control means associated with said selected movable element, the improvement comprised in that:

said apparatus includes means responsive to a first signal representative of the distance to be traveled by said selected movable element from its actual position to a desired stopping position for generating a second signal proportional to a predetermined optimum velocity of movement for each of said plurality of movable elements when required to be moved a distance represented by said first signal, a plurality of multiplication means respectively associated with said plurality of movable elements, each multiplication means being coupled to said means for generating a second signal and being capable when enabled of multiplying said second signal by a constant representative of the particular motion characteristics of the associated movable element in order to form a velocity command signal representing the predetermined optimum velocity of movement for said associated movable element, and means coupled to each of said plurality of multiplication means and responsive to a third signal representative of the selection of said selected movable element for enabling the multiplication means associated with said selected movable element.

27. Apparatus for generating a plurality of velocity command signals for application to a respective plurality of servo control systems for effecting the controlled movements of a respective plurality of movable elements, said apparatus comprising:

memory means addressable in a time-shared manner by a plurality of address signals each defining a particular address location in said memory means and representing a particular distance to be traveled by a respective one of said movable elements from its actual position to a desired stopping position, said particular address location storing a normalized velocity command signal proportinal to a predetermined optimum velocity of movement for each of said plurality of movable elements when required to be moved said particular distance;

a plurality of multiplication means respectively associated with said plurality of movable elements, each multiplication means being coupled to said memory means and being capable when enabled of multiplying said normalized velocity command signal by a constant representative of the particular motion characteristics of the associated movable element in order to form a velocity command signal representing the predetermined optimum velocity of movement for said associated movable element; and means coupled to each of said plurality of multiplication means and responsive to a plurality of data tag signals respectively identifying said plurality of movable elements for successively enabling the plurality of multiplication means in accordance with the order in which said address signals were applied to said memory means.

* * * * *